Nov. 26, 1929.   H. R. PATTERSON   1,736,982
CONTROL SYSTEM FOR DYNAMO ELECTRIC MACHINES
Filed March 12, 1925   3 Sheets-Sheet 1

INVENTOR
Harry R. Patterson
BY
Chester H. Braselton
ATTORNEY

Nov. 26, 1929.   H. R. PATTERSON   1,736,982
CONTROL SYSTEM FOR DYNAMO ELECTRIC MACHINES
Filed March 12, 1925    3 Sheets-Sheet 2
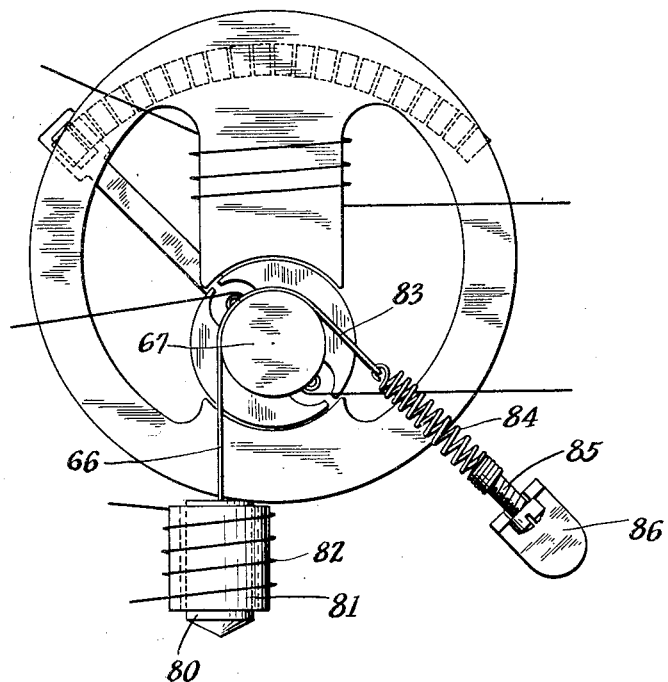
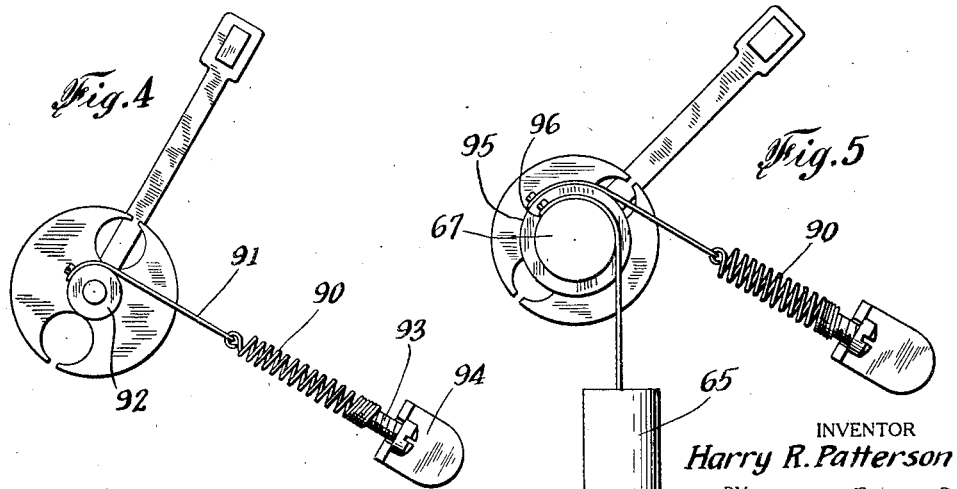
INVENTOR
Harry R. Patterson
BY
ATTORNEY Nov. 26, 1929.   H. R. PATTERSON   1,736,982
CONTROL SYSTEM FOR DYNAMO ELECTRIC MACHINES
Filed March 12, 1925   3 Sheets-Sheet 3
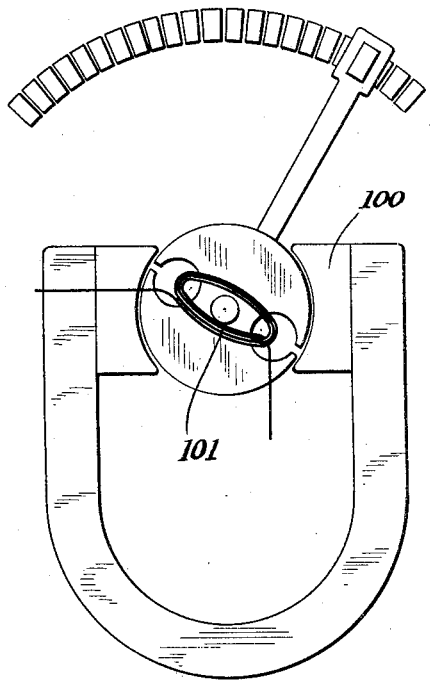
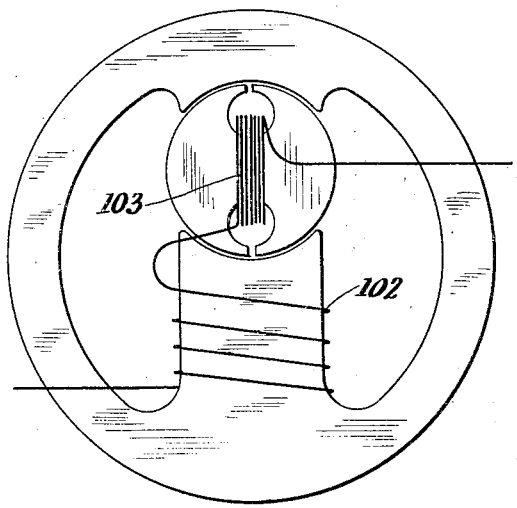
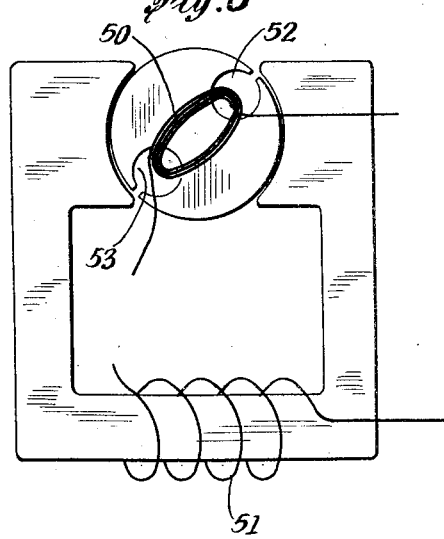
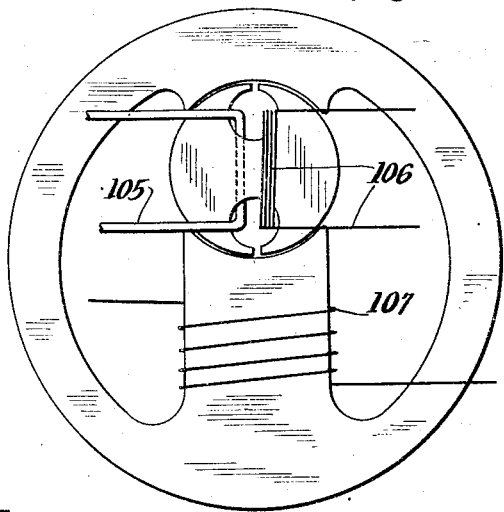
INVENTOR
*Harry R. Patterson*
BY
ATTORNEY Patented Nov. 26, 1929

1,736,982

UNITED STATES PATENT OFFICE

HARRY R. PATTERSON, OF POUGHKEEPSIE, NEW YORK, ASSIGNOR TO DE JON ELECTRIC CORPORATION, A CORPORATION OF DELAWARE

CONTROL SYSTEM FOR DYNAMO-ELECTRIC MACHINES

Application filed March 12, 1925. Serial No. 14,899.

This invention relates to control systems for variable speed dynamo-electric machines. More particularly, my invention relates to means for controlling both voltage and current output of a dynamo-electric machine susceptible to variations in rotative speed.

Various devices and systems of control have been proposed for variable speed dynamo-electric machines involving the use of electro-magnetic devices for regulating the output of a machine or for controlling the power applied to the shaft of the machine. In the former class, are included such regulators as the vibratory contact units placed in series with the shunt field and operating intermittently to insert a resistance in the shunt field circuit or to break said circuit so that the average current flow through the field is approximately constant.
As exemplary of the second type of control, are the centrifugal devices which operate to vary the amount of the current supply to the power means or the dynamo-electric machine. These control means have been found to have certain disadvantages such as uncertainty of operation and mechanical weaknesses which have tended to limit their usefulness.

It is one of the important objects of this invention to provide mechanism and system of control which will efficiently operate to regulate the voltage of the variable speed generator. An object also is to provide means usable in conjunction with said voltage regulator for limiting the maximum current output of the system. Another object of the invention consists in the provision of a wiring system usable in conjunction with mechanical unit control, all combining to properly regulate both the voltage and current of the dynamo-electric machine to which it is applied. An important object also is to insure the highest degree of stability and efficiency of operation of a control system which effectively maintains the voltage within certain limits without the necessity of utilizing centrifugal or clutch mechanism or, especially in the voltage control, the employment of vibratory elements which tend to decrease in efficiency and are subject to break down, and other disadvantages.

Generally considered, my invention may be described as the utilization in a power circuit of a dynamo-electric machine of an auxiliary power means adapted to vary the resistance of the circuit of the dynamo-electric machine in accordance with the variation in machine voltage and in such fashion as to maintain the voltage across the mains of the machine at an approximately constant value; and in the employment in the same circuit in series with the machine of a vibratory element adapted to limit the current output thereof to a predetermined maximum.

In order to disclose the invention in its essential phases there is described hereinafter in detail, a system which may be preferred which embodies the essential inventive ideas, this system and various detailed modifications thereof all as shown in the accompanying drawings, in which Fig. 1 is a diagrammatic showing of the resistance unit coupled with the wiring diagram and dynamo-electric machine with the associated circuits;

Fig. 3 is a view of a modified form of resistance unit; and

Figs. 4, 5, 6, 7, 8 and 9 are additional modified showings of the details of a resistance unit.

Figure 1:
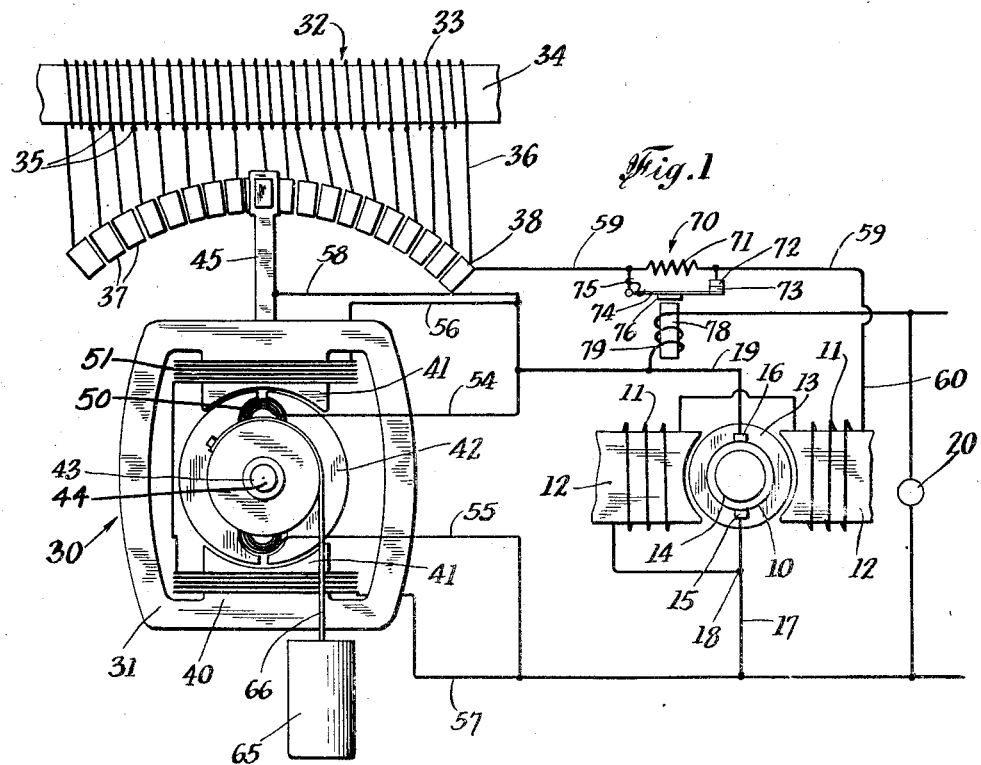

Referring specifically to Fig. 1, I have shown a dynamo-electric machine 10 having a mechanical construction of design here shown as a bi-polar generator with a shunt field 11 connected in series on the cooperating field poles 12. The armature 13 of the machine carries the commutator 14 on which is mounted brushes 15 and 16, the main load wire 17 extending from the brush 15. The field 11 forms a junction with the load wire 17 at point 18.

From the brush 16 of the dynamo-electric machine extends the load circuit wire 19, and intermediate these load wires 17 and 19 is interposed the normal load elements of the system as indicated at 20.

I utilize two control units in my system of regulation, one unit involving control of voltage and the other of maximum current output. Referring particularly to Fig. 1, I may designate generally, as by the numeral 30, the voltage control unit, this unit including a motor 31 and the multiple variable resistance 32. The resistance unit 32 is in series with the shunt field 11 of the dynamo-electric machine 10 and consists of a multiple resistance winding 33 suitably mounted upon a support 34 and having a plurality of independent taps 35 on one side of the unit which are electrically connected by wires 36 with contact plates 37 formed, as clearly shown in Fig. 1, along the arc of a circle. The arrangement of the resistance is such that for a connection at contact block 38 there is a zero resistance and that for successive contacts to the left, as shown in Fig. 1, there is a step by step increase of resistance within the field circuit increasing to the maximum at the extreme left of the unit.

The motor 31 forming a cooperative member with the resistance unit, comprises a frame 40 having integral opposed field poles 41 between which an armature 42 is adapted to have a limited rotation, for the purpose of the present invention this rotation being approximately 90°. Suitable bearings 43 are provided for this armature and stops for limiting its degree of movement. Fixed to the armature shaft 44 of this motor is a contact arm 45 carrying at its end, at which it is detachably fixed, a contact block 46 adapted to engage the various contact plates 37, as the arm 45 is rotated. The degree of movement of the rotor 42 of the motor is, of course, determined by the stop limits of the resistance unit, the contact 46 being adapted to traverse all of the various plates of the resistance coil.

The motor 30 in the showing of Fig. 1 is of the shunt type, the armature having a series winding 50, shown in Fig. 8, and a shunt winding 51 in parallel with the series winding in so far as the main terminals of the dynamo-electric machine 10 are concerned. The series winding 50 consists merely in a few coils wound axially about the armature thereof within the slots 52 and 53. One end of the series winding connects by means of the wire 54 to the main load wire 19, and the other end of the series winding connects by means of the wire 55 with the main load wire 17 of the dynamo-electric machine. One end of the field winding 51 connects by means of wire 56 with the load wire 19, and the other end of the shunt field by wire 57 to the load wire 17.

Series connection of the resistance element 32 with the field 11 is made through the contact arm 45 there being a connection by means of wire 58 between the arm 45 and wire 19 and also by means of wire 59 between the contact block 38 and the end 60 of the shunt field. It is thus apparent that current through the field necessarily must pass through that section of the resistance unit 32 included between the contact block 38 and the point of contact of the movable contact plate 46 with a corresponding resistance contact plate.

It results from the structure as above described, that the resistance motor 30 is connected in shunt with the main brushes of the dymano-electric machine 10 and in parallel with the load 20 and that the resistance unit 32 is in series with the shunt field only. The direction of rotation of the motor when energized by current from the dynamo-electric machine 10, is counter-clockwise, as viewed in Fig. 1 of the drawing, such movement resulting in a left movement of the contact arm 45 in accordance with the increase of current supply to the motor 30. Means are provided, as shown in Fig. 1, to normally maintain the contact arm 45 at the extreme right or zero resistance position of the unit. This means is comprised in a weight 65 suspended by a flexible cord 66 from a wheel 67, the periphery of which is channeled to form the groove 68 in which the flexible cord 66 is attached by any suitable means, and in such manner as to tend to rotate the armature of the motor in a clockwise direction. It is obvious that when electrically energized, the motor will tend to rotate against the gravitational pull of the weight 65 and that when the electrical energy supply to the motor is dimished, the weight will tend to reduce the resistance within the field of the circuit of the machine 10 to a minimum value.

The operation of the voltage control will now be discussed. The voltage of a dynamo-electric machine having a shunt field, such as is shown in Fig. 1 of the drawing, is determined by the amount of current passing through the shunt field, the greater flow of current in the field, the greater the voltage applied to the main brushes in the machine, in well defined limits, as determined by the physical characteristics of the machine. In a shunt wound dynamo-electric machine having a fixed field resistance with increase of rotative speed of the machine armature, there is a gradual rise in voltage with a consequent increase in current flow in the shunt field, and this for many uses is undesirable as, for example, in the field of lighting where an approximately constant voltage applied to the lamps is very desirable. In order to overcome this variation of voltage in a shunt wound machine in accordance with speed, it has been proposed to increase the resistance of the shunt field. An effective means of maintaining this voltage approximately constant is to increase the resistance in the shunt field with increase of speed in a manner as above described; and this is accomplished by increasing the resistance step by step of a field circuit, as the voltage on the main terminal of the dynamo-electric machine increases, this increase of resistance changing the current flow from the shunt field so that the net result of the increase in speed is an approximately constant voltage applied to the mains of the machine.

It is obvious that the various physical constants of the units may be varied so as to attain with great accuracy, the voltage effects desired. For instance, the resistance of the various steps of the resistance unit 32 may vary in different stages thereof, if such variation is found to give better results. Also, it is obvious that by varying the mass of the weight 65, the movement of the contact arm 45 will be correspondingly varied. Various other modifications and changes will be apparent also to those skilled in this particular art.

The current control means of the invention is included generally in the unit 70, shown in Fig. 1 of the drawing, this unit embodying a vibratory contact arrangement adapted to limit the output of current of the dynamo-electric machine to a pre-determined value. In the form disclosed, the current control unit consists in a fixed resistance 71 connected about which is a shunted circuit containing the fixed contact 72 and a cooperating movable contact 73 pivotally mounted upon a supporting arm 74. A spring 75 normally maintains contacts 72 and 73 in close position, the resistance 71 being thereby normally short circuited. There is secured to the arm 74 a magnetic plate 76 which is adapted to be attracted by a core of the electro-magnet 78 having a coil 79 wound thereabout and interposed in series in the main load circuit 19 so that all current passing through the load 20 necessarily must pass through the coil 79 and exert electro-magnetically, an attractive force on the plate 76 fixed to the contact arm 74.

It will be perceived that in accordance with this construction and arrangement, when the current and load circuit arrive at or exceed a given maximum value, it will attract the armature 76 thereby separating the contacts 72 and 73 and throwing the resistance 71 into series with the field coil 11. The effect of this of course is to diminish the field current thereby diminishing the current load circuit to such an extent as to permit the closure of the contacts 72 and 73. If the current supply again arrives at the maximum value, the contacts are again opened and this intermittent opening and closure of the contact 72 and 73 under the influence of the electro-magnet 78, maintain the current at an average maximum value which has been predetermined as the proper limiting value of the apparatus and system. That the control unit operates only when the current in the load circuit arrives at the circuit maximum value is evident, there being no functioning of this unit at the lower current values.

In the various additional figures of the drawings I have shown variations of the motor control of the voltage control unit 70 which have been found advantageous under certain conditions of use. In Fig. 3 there is shown a motor of the shunt wound type similar to that of Figs. 1 and 8 with the addition, however, of a solenoid effect, the weighted mass corresponding to the weight 65 of Figs. 1 and 2. In this figure to the cord 66 is suspended a mass 80 movable in a cylinder 81 about the periphery of which is a winding 82 connected in any appropriate way with the main load circuit as, for example, in series with the motor armature. The cord 66 is extended over the wheel 67 in a cord section 83 terminating in a coil spring 84 adjustably fastened by the screw 85 to a support plate 86.

Figure 2:
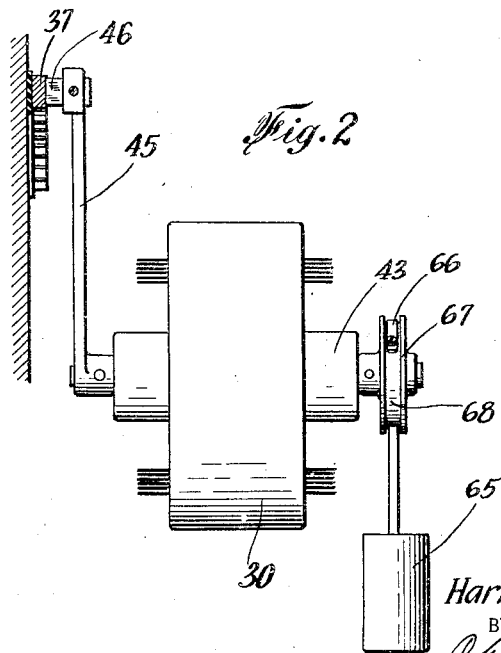
Fig. 2 is a side view of the resistance unit.

With the cord 66 fastened to the wheel, as in the showing of Figs. 1 and 2, it is apparent that both the spring 84 and the solenoid 82 tend to exert rotational movement upon the motor armature and thus control the position of the contact arm 45. This form of control is more flexible and more certain than that shown in Fig. 1 and may be varied and modified to give finer or closer regulation than that possible in the showing in Fig. 1.

In Fig. 4, I have shown a type of control for the motor rotor consisting solely in the coil spring 90 attached at one end by the flexible cord 91 to the motor wheel 92 and at its other end to the adjustable screw 93 attached to the plate 94. This modification involves a substitution of the spring 90 for the mass 65 of Fig. 1.

In Fig. 5 there is shown a further modification of the control means of the motor rotor which involves the utilization of the devices of Figs. 1 and 4 in a single device, a mass 65 and a spring 90 being both attached to the wheel 67 which in this case is provided with duel curvilinear surfaces 95 and 96. This arrangement has advantages under certain conditions of operation.

Fig. 6 shows a type of motor in which permanent magnets 100 are employed in conjunction with a series winding 101 on the armature of the motor.

Fig. 7 illustrates the employment of a series type of motor with both a field 102 and armature 103 in series; and Fig. 9 illustrates the use of a compound wound motor having a series coil 105, auxiliary winding 106 and field winding 107. These various modifications are found to be useful under certain conditions of operation, and are typical of changes and variations of the fundamental arrangement of the invention which may be made by those skilled in the art. I therefore do not desire to limit my invention to these disclosures, the invention being defined only by the claim as hereto appended.

Having described my invention, what I desire to claim as new is:

In a control system for dynamo-electric machines, the combination of a dynamo-electric machine having a shunt field; a variable resistance interposed in series with said field; motor operated means for varying said resistance in accordance with the variation of voltage of said dynamo-electric machine, said motor means being electrically connected in parallel with said machine; and additional means for limiting the amount of current output of the dynamo-electric machine within certain predetermined limits comprising a fixed resistance in series with said field and means to cut said fixed resistance into the field circuit, said means depending solely upon the current output of said dynamo electric machine.

In testimony whereof, I affix my signature.

HARRY R. PATTERSON.